(12) United States Patent
Craig

(10) Patent No.: US 11,585,021 B2
(45) Date of Patent: Feb. 21, 2023

US011585021B2

(54) FABRIC REINFORCED WITH CARBON NANOSTRUCTURES TO IMPROVE MECHANICAL PERFORMANCE

(71) Applicant: Hugh Craig, Sedona, AZ (US)

(72) Inventor: Hugh Craig, Sedona, AZ (US)

( * ) Notice: Subject to any disclaimer, the term of this patent is extended or adjusted under 35 U.S.C. 154(b) by 199 days.

(21) Appl. No.: 15/330,105

(22) Filed: Aug. 5, 2016

(65) Prior Publication Data

US 2022/0081808 A1 Mar. 17, 2022

(51) Int. Cl.

| | |
|---|---|
| *C01B 32/168* | (2017.01) |
| *C01B 32/182* | (2017.01) |
| *B82Y 30/00* | (2011.01) |
| *B82Y 40/00* | (2011.01) |
| *D03D 1/00* | (2006.01) |
| *D03D 15/573* | (2021.01) |

(52) U.S. Cl.
CPC ......... *D03D 1/0052* (2013.01); *C01B 32/168* (2017.08); *C01B 32/182* (2017.08); *D03D 15/573* (2021.01); *B82Y 30/00* (2013.01); *B82Y 40/00* (2013.01); *C01P 2004/13* (2013.01); *C01P 2004/24* (2013.01); *C01P 2004/64* (2013.01); *C01P 2006/90* (2013.01); *D10B 2501/04* (2013.01)

(58) Field of Classification Search
None
See application file for complete search history.

(56) References Cited

U.S. PATENT DOCUMENTS

| | | | | |
|---|---|---|---|---|
| 8,951,631 | B2 * | 2/2015 | Shah | B05D 1/18 |
| | | | | 977/750 |
| 9,005,755 | B2 * | 4/2015 | Ledford | D03D 15/275 |
| | | | | 428/368 |
| 2010/0028681 | A1 * | 2/2010 | Dai | B82Y 40/00 |
| | | | | 252/301.16 |
| 2010/0098877 | A1 * | 4/2010 | Cooper | B01D 67/0079 |
| | | | | 977/890 |
| 2012/0088934 | A1 * | 4/2012 | Zettl | C07C 233/65 |
| | | | | 977/750 |
| 2012/0202397 | A1 * | 8/2012 | Wolf | H01B 1/24 |
| | | | | 977/932 |

FOREIGN PATENT DOCUMENTS

| | | | | |
|---|---|---|---|---|
| WO | WO-2010115550 A1 * | 10/2010 | | B82Y 30/00 |
| WO | WO-2012177223 A1 * | 12/2012 | | A01N 59/16 |

\* cited by examiner

*Primary Examiner* — Arti Singh-Pandey
(74) *Attorney, Agent, or Firm* — Avek IP, LLC; William B. Kircher

(57) ABSTRACT

Fabrics that have unique mechanical properties are comprised of fibers that have been reacted to provide carbon nanostructures covalently grafted to these fibers so that the entanglement and/or the reactive bonding between adjacent fibers creates a hierarchal structure reinforcement of the fabric. This entanglement and/or reactivity is also effective for developing reinforcement between plies of structural fabric composites in order to enhance inter-laminar shear strength and mechanical properties.

14 Claims, 8 Drawing Sheets

R = OH,
COOH,
NH2

R = OH, COOH, NH$_2$

FABRIC REINFORCED WITH CARBON NANOSTRUCTURES TO IMPROVE MECHANICAL PERFORMANCE

FIELD OF THE INVENTION

The present invention relates generally to novel materials and methods for producing high performance flexible composites and fabrics made from (1) high-strength fibers and (2) carbon nanostructured materials.

The present invention relates specifically to (1) adhering carbon nanostructured materials to flexible composites and fabrics principally made from high-strength fibers by (2) using these materials in combination (e.g., graphene, graphene oxide, graphene nano ribbons, carbon nanotubes and the like) so as to provide covalent adhesion; synergistically increasing strong entanglement between fibers.

BACKGROUND OF THE INVENTION

Ballistic Fabrics

High-strength textiles and fabrics are used in varied applications including body armor, high strength flexible polymeric composites, construction tensile fabrics such as used for military enclosures and general construction, sail cloth, parachute cloth and clothing. In most cases the functional performance of fabric used in these applications can be enhanced by increasing fabric inter laminar shear strength, tensile strength and/or penetration resistance. Improved performance is particularly advantageous when accompanied with significant weight reduction and/or lower cost.

Two prime examples suggest themselves. In the case of ballistic fibers, better protection at lower weight is a mandatory improvement. There have been new materials introduced that increase the strength and modulus of fabric armor in order to provide marginally improved protection including better projectile and stab resistance—at somewhat lower weight. However, significant improvement in all aspects requires a new paradigm of thought. Turning next to high-strength flexible composites made from high-strength fabrics and yarns, a particularly pervasive problem is managing inter-laminar shear strength so as to provide such equal improvement in mechanical properties as has now, circa 2016, been realized for solid carbon laminates. Making structural improvements in both (1) the mechanical properties of individual plies, as well as (2) inter ply linkage, would be desirable to significantly increase the properties of any and all flexible composites incorporating carbon structures. A manufacturing process that was simple and straightforward, and adaptable to roll to roll processing, could, if coupled with lighter weight (from using less material), provide a better performing flexible composite product at lower cost.

Soft Armor

It will be seen that one focus of the present invention is to provide an anti-ballistic fabric-based soft armor that is significantly more effective due to the hierarchal structures of nanostructured materials taken in such combination.

Various types of body armor have been used since records of war have been kept. Animal skins, wooden and metal shields, and metal suits of armor were among the first materials used to protect those engaged in combat. As weapons became more complex, so did the protective armor. Bullet proof vests were first available in the 1920s. Flak Jackets, made from ballistic nylon, were used in World War II primarily to protect the wearer from ammunition fragments, not against direct ammunition fire.

Early body armor was bulky, heavy, and uncomfortable to wear for any length of time. In the 1960s, new, fibrous materials began to arise on the market, and by 1970, DuPont's Kevlar® fiber (Kevlar® is a registered trademark of E. I. du Pont de Nemours and Company) was introduced. This new class of spun fibers made it possible to weave a fabric that, when used in layers, could be made into armor. Due to the reduced weight and material flexibility, this body armor made from spun fibers could be worn for greater lengths of time and offered greater protection.

Today, many different types of body armor exist in many forms. Wearable armor is still, for the most part, made from woven fibers with options to add ceramic based composite plates depending on the tactical situation. Vehicles requiring ballistic protection largely rely on metal plating or composite panels. Although modern armor has improved over the years, there is still a need for lighter weight and more effective armor. Even with new fiber based materials, modern day soldiers can expect to carry as much as 40 pounds of armor. Additionally, the spun fiber systems suffer loss of efficacy in humid conditions and when in high temperature situations. The physics for hard and soft armor differ. In the case of hard armor (ceramic plates) the mechanism of effect lies in absorbing and dissipating the projectile's kinetic energy in local shattering of the ceramic plate and blunting the bullet material on the hard ceramic.

Any backing of high-strength cloth such as Spectra® fiber cloth (Spectra® is a registered trademark of Honeywell, Inc.) then spreads the energy of the impact to a larger area and stops the fragments, reducing the likelihood of fatal injury to the wearer. This is the same principle that is used for the ceramic tiles used for the armored cockpits of some military airplanes, and the anti-spallation liners used in modern armored personnel carriers.

Soft armor based on fabric has been in general use for anti-ballistic purposes for the past several decades. The original high strength fiber, Kevlar® fiber, was invented by DuPont in 1971 and was shown to bring high strength and toughness to composite materials which generated its application to armor. The Kevlar® fiber has a tensile strength of 3600 mPa and an elongation of 20% which illustrated the ability to stop high speed projectiles fired from pistols when woven into fabric and deployed in multiple layers, as taught in the original patent.

Further development in fiber technology enhanced anti-ballistic fabric with improved fiber and weaving and the development of Ultra High Molecular Weight Polyethylene spun and oriented fibers by Allied Chemical (Spectra fiber, now a Honeywell product) and DSM (Dyneema). These fibers showed higher tensile and elongation properties than Kevlar fiber. Fabrics made with these materials currently compete in the marketplace.

Neither of these materials are the ideal material as Kevlar is hydroscopic and loses strength in wet conditions. UHMWPE has a thermal issue and loses strength at high temperature. These materials currently share the soft armor market.

Carbon Nanotube Reinforced Soft Armor

The seminal work on reinforcing fabric armor with CNT was conducted by Lockheed Martin, Inc., and is discussed in U.S. Pat. No. 7,354,877. Although the concept was exciting, it was never reduced to practice because the agglomeration of the nanotubes did not allow sufficient contact between the fibers and CNT, and effective surfactant or functionalization of the CNT was not disclosed.

Further development of CNT reinforced fabric was reported by Juvang Liu and associates in a 2009 paper Functionalization of Cotton with Carbon nanotubes appearing in J. Mater. Chem. This work showed that dipping cotton fibers and yarn into a CNT/solvent significantly improved the materials strength, flame retardant, and UV resistance. This was attributed to solvent swelling of the cotton, allowing CNT ingress into the fiber which became locked in place upon drying the cotton fibers.

In another 2009 Paper, O'Connell et al at Trinity College, University of Dublin, following the process developed by Liu et al (discussed above) for CNT reinforcement of cotton fabric, disclosed the technique of swelling the Kevlar fibers with N methyl Pyrrilidone while in the fabric with polar solvent and surfactant to provide contact and adherence of the CNT to the fibers of the Kevlar fabric and illustrated significant improvement of tensile strength and toughness. (+30% with no loss of elongation). This inventive work is subject of Patent WO 2007010517 1A. The principal drawback to commercialization of this technology is extremely long process time in solvent deemed unsafe by US EPA The next major development occurred at the University of Maryland wherein a student group functionalized the carbon nanotubes with BPA, again based on previous work by Lui, and added the functionalized tubes to acid treated Kevlar fabric following the procedure pioneered by Lui and O'Connell for cotton. By heating and catalysis a CNT network around the fibers was realized which provided two major benefits: (1) higher strength and toughness, and (2) immobilization of the fabric by CNT following ballistic hits.

The drawbacks to this method are 1) weakening of the Kevlar fiber by the acid attack; and 2) the process does not allow complex nanostructures to form hierarchal structure to maximize properties.

The first commercial application of CNT reinforced soft armor was by Salt Lake City, Utah, based Amendment II Corporation. Although this product passed the requirements of The National Institute of Justice requirement for Level 2 armor, it was never been tested for NIJ Level 3.5, which is required for military procurement. Another soft armor producer, AR 500, is currently advertising a CNT reinforced Kevlar product that they state complies with NIJ Level 3.5 standard.

These products are made by coating the fabric with a solution of CNT in polymer which does not intercalate the CNT into the fibers of the fabric.

At the same time, a patent was applied for by the Founder of Amendment II, Richard Craig and University of Utah Researcher Agnes Ostafin claiming similar technology as WO 2007010517 1A, but with a claim that the method of production created a gradient of CNT across the fabric thickness which provided enhanced flexibility. This technology has not been commercialized as of 2016.

More recent research into the technique developed by Trinity College (WO 2007010517 Al) has been accomplished by Morgana Trexler and colleagues at Johns Hopkins University. By improving the NMP solvent swelling process and CNT insertion method they report a 35% higher strength, and, more importantly, show results of single fiber pullout strength that attributes the property enhancement to entanglement of the CNT on the fibers. Their testing also included ballistic test that illustrated significant performance enhancement v standard Kevlar.

Nanocomposites

This rapidly emerging technology of nanocomposites is based on the use of carbon and other nanomaterials in structural composites, used independently or in conjunction with existing advanced composite materials, to increase strength and toughness. These nanocomposites are currently replacing metal structural panels and components in aerospace, aeronautical, automobile applications.

Most commonly the nanomaterials are added separately to a binding resin, and are not integrated to the principal reinforcing fibers. However, forward looking research is looking to functionalize the carbon fiber to enhance bond strength to the polymer matrix.

Other work is based on catalytically growing CNT onto carbon fibers. The initial results of this work show attainment of significantly improved mechanically properties. Also, researchers are proposing covalent bonding of functionalized carbon nanotubes to functionalized carbon fiber.

Still other research has shown that utilizing both carbon nanotubes and graphene added separately has a synergistic effect on strength and modulus. An additive of mixed tubes and platelets develops twice the strength of same amounts of graphene or CNT added to the composite.

Advanced composite structures are constructed as laminated plies of the glass or carbon fiber fabric that has been impregnated with polymer resin. The weak point of this system, and the place of likely failure is at the shear plane between these plies (inter laminar shear). Methods to improve inter-laminar shear strength that are currently available include (1) three dimensional stitching of the fabric, and (2) adding a bond ply of vertically aligned carbon nanotubes. These solutions are not ideal. The stitching process is weaker in the Z axis and is limited in the number of plies that can be combined.

In yet another attempted solution a ply of aligned CNT is inserted between the laminate fabric plies. This insert is designed to develop structural entanglement between the plies in which it is in contact, thus providing inter ply attachment. This technique amounts to a very expensive solution to this problem.

SUMMARY OF THE INVENTION

The present invention contemplates novel materials and methods for producing yarn, or textiles, or fabrics that are useful in further construction of advanced flexible composite structures, including a high-performance anti-ballistic fabric-based soft armor. These new materials are synergistically effective to provide maximum strength with minimum weight due to combined hierarchal carbon microstructures within the fabric.

An initial focus of the present invention was to provide an anti-ballistic fabric-based soft armor that is significantly more effective due to the hierarchal structures of nanostructured materials taken in such combination as effectively causes entanglement of adjacent fibers (similar to Velcro entanglement), and which thereby develops a hierarchal net-like structure between fibers that serves to enhance both strength and toughness of the fabric.

The present invention particularly contemplates (1) adhering carbon nanostructured materials to a fiber by functionalizing these nanostructured materials to provide covalent adhesion to the fiber, while (2) using a combination of these adhered nanostructured materials (e.g., nanostructures made from graphene, graphene oxide, graphene nano ribbons, carbon nanotubes and the like) so as to synergistically increase entanglement between fibers. The entangled fibers form a net-like structure, thus enhancing the strength and toughness of any fabric or other composite produced from the fibers. In fact, the fabrics so produced from the fibers provide superior performance at lighter weight to all fabric-based systems known to the inventor.

Alternatively expressed, the present invention contemplates (1) covalently bonding carbon nanostructures to fibers, strands and threads, and then (2) using the fibers, strands and threads so formed to make composite bodies, and fabrics having improved performance. The carbon nanostructures consist of one or more carbon nanomaterials: carbon nanotubes, graphene and graphene oxide, and the like. These nanomaterials can either be used singly, or, importantly and preferably, incorporated into more complex structures by covalently joining. In particular, joined binary nano carbon structures (CNT/graphene/graphene oxide) are already recognized, circa 2016, as having a synergistic strengthening effect on nanostructures formed therefrom. This enhancement of physical properties can be attributed to the higher level of entanglement that occurs when one-dimensional and two-dimensional materials are tangled together.

By covalently bonding entangled carbon nanostructures to threads, and then making composites and fabrics from the threads, these composites and fabrics are much improved in physical properties, particularly in the inter laminar shear strength of laminated structures comprised of multiple plies of fabric impregnated with polymer resin fabrics. Although these improvements have much wider application than only armor and body armor, in ultimate use for these particular applications both anti-ballistic and anti-stab resistance are significantly improved.

Detailed embodiments of the present invention are disclosed herein. However, it is to be understood that the disclosed embodiments are merely exemplary of the invention, which may be embodied in various forms. This particularly relates to the functional groups attached to the fabrics and nanomaterials and the myriad of potential reactions that are possible with these reactants, and their chemically modified variants.

DESCRIPTION OF THE PREFERRED EMBODIMENT OF THE INVENTION

The fabric may be constructed of at least one of fibers, yarns or tow. Examples of fibers include, but are not limited to, Fiberglass, carbon, nylon, polyaramid, polyester, polyurethane, polynitriles, polyethylene, polypropylene, polyvinylchloride, polystyrene, polyacrylonitrile, polytetrafluoroethylene, polymethyl methacrylate, polyvinyl acetate, or natural fibers. Preferably, the fabric is constructed of polyaramid, known as Kevlar, or Ultra high Molecular Weight Polyethylene (UHMWPE) known as Spectra and Dyneema which is commonly used to produce anti-ballistic body armor; or for structural composites made from glass, carbon, or other reinforced composite fiber.

The fabric is functionalized by chemical, additive, or plasma methods to provide chemically reactive sites on the fabric strands which will allow covalent attachment of nano- or micro-particles, including, but not limited to, carbon nanotubes (CNTs), graphene, graphene oxide, graphene nano ribbons that can be used separately or in combination. The CNTs may be single-walled or multi-walled, and the graphene materials maybe single, few or multilayered. In a preferred embodiment, the fabric is plasma functionalized which can provide several reactive moieties including, but not limited to, hydroxyl, carboxyl and amine, which are capable of covalent reaction with functionalized nanoparticles including carbon nanotubes, graphene, and graphene oxide. By further reaction, the nanoparticles and nanostructures are covalently attached to the fabric and each other.

Figure 1:
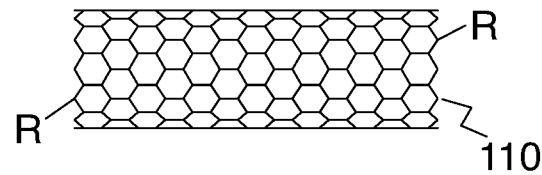
FIG. 1 is an illustration of the nanocarbon materials that are used to develop the inventive products which includes functionalized CNT and graphene and naturally functional graphene oxide.
Figure 1:
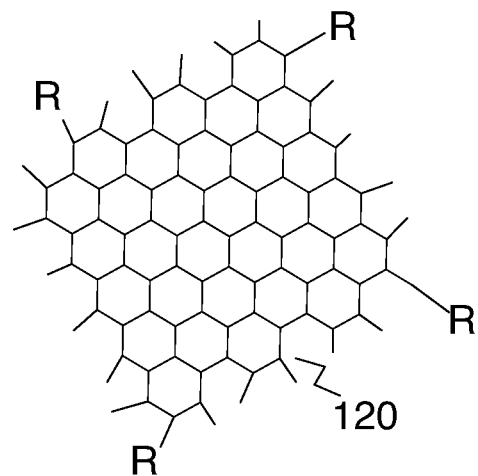
Figure 1:
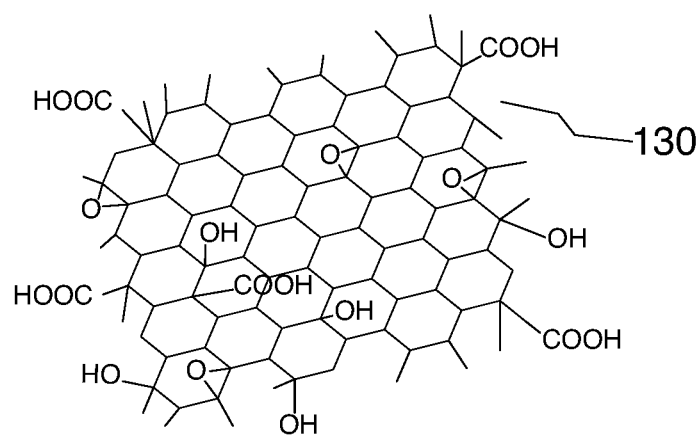
Figure 2:
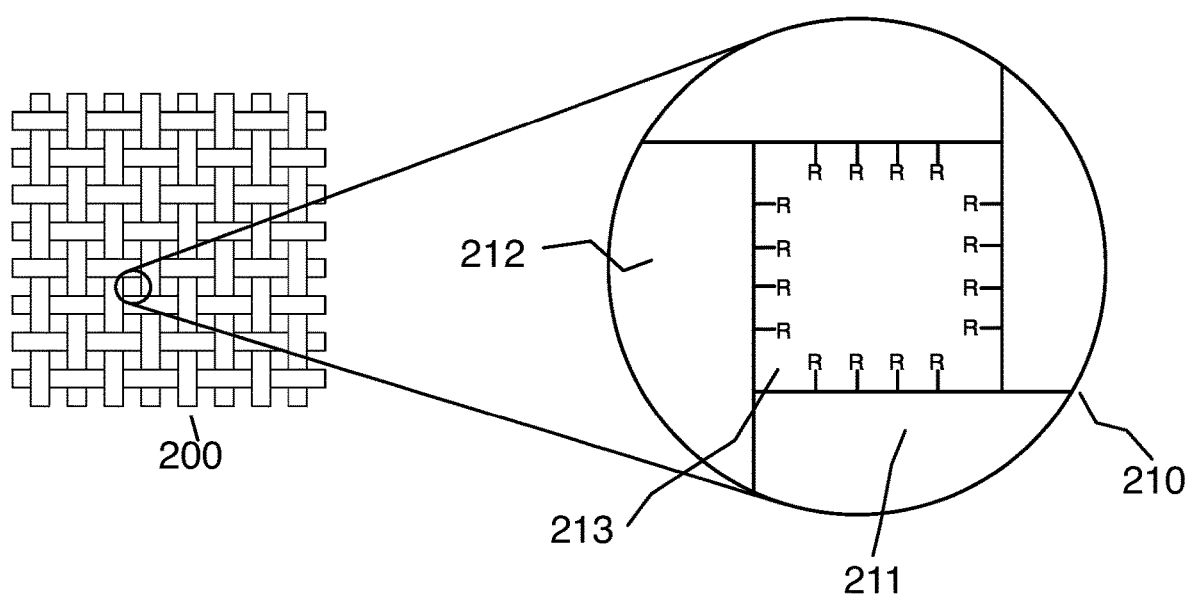
FIG. 2 is a plan view showing is the Plasma treated woven fabric illustrating various plasma generated functional groups that are easily applied to fabrics and are useful for the invention.

Functional carbon Nano particles. Gas plasma functionalized graphene and carbon nanotubes were purchased from Cheap Tubes Inc. and used as received. These materials were gas plasma functionalized. Carbon nanotubes (110) and graphene (120) with —OH (hydroxyl), COOH carboxyl) and —NH2 (amine) functional groups were obtained. Graphene oxide (130) was not purchased, but is widely available to use a substitution for graphene in the invented nanostructures. An illustration of these materials is shown in FIG. 2.

Functionalization of Fabrics

The fabrics (200) for development of the examples and test coupons were functionalized by gas plasma (210) at Plasmatreat in Belmont Calif. The gases used to treat the fabrics were ammonia to provide amine functionality and carbon dioxide to provide hydroxyl functionality, Carboxyl functionality is accomplished with vapor of acetic acid. The dwell time in the plasma determined the extent of functionalization. FIG. 2 is a plan view of the plasma treated fabric showing the functionalization that can be accomplished with gas plasma treatment. The breakout illustration shows woof (211) and warp (212) fibers that have been gas functionalized (213).

Isocyanate Functional Carbon Nanotubes

Figure 3:
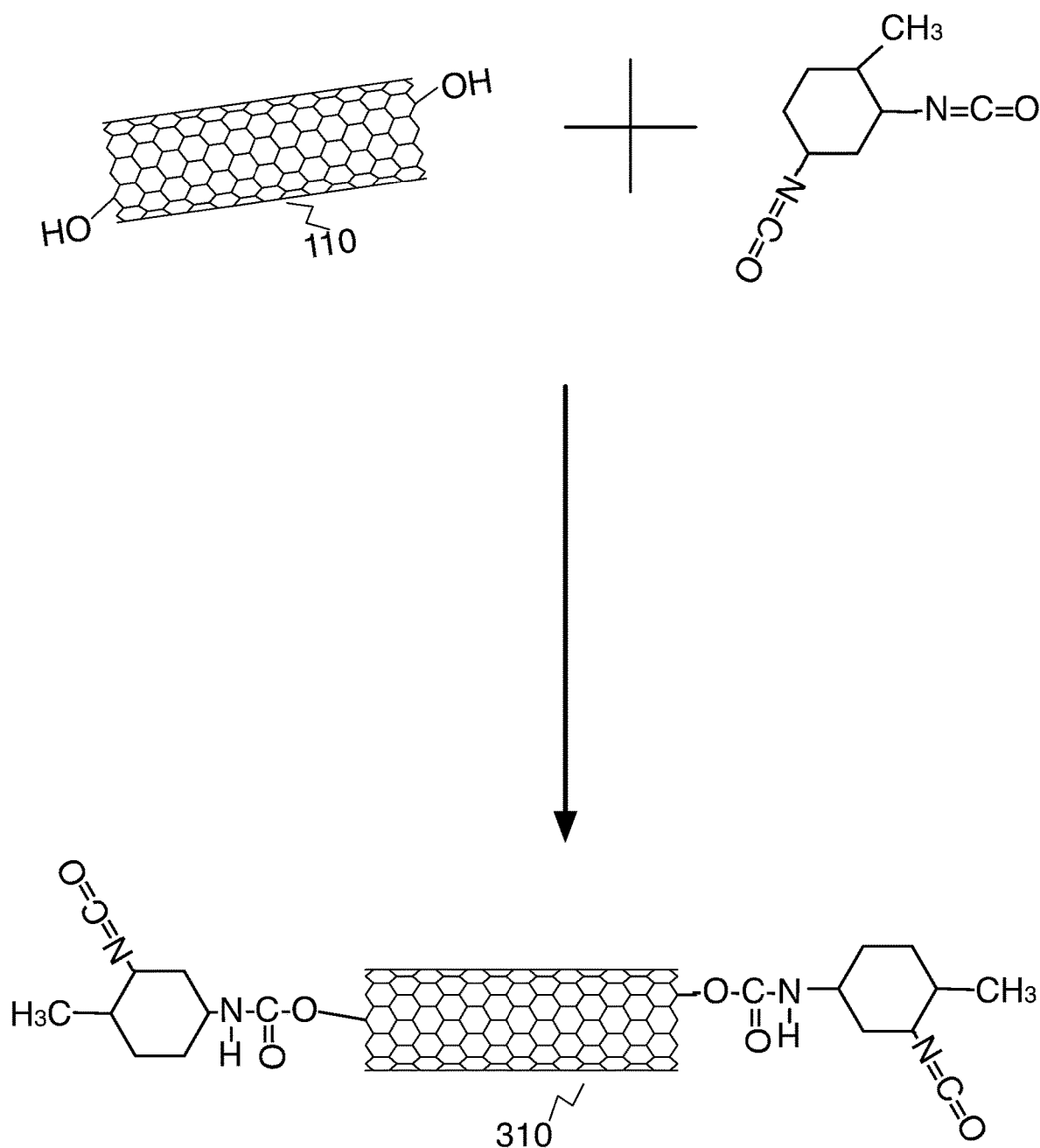
FIG. 3 is an illustration of the chemical synthesis used to provide isocyanate functionality to carbon nanotubes.

Both hydroxyl and carboxyl functional CNT readily react with isocyanate. To synthesize isocyanate functional CNT (310), hydroxyl functional CNT (110) was reacted with Toluene Di-isocyanate (TDI) in solvent solution. TDI was chosen because of the higher reaction rate of the ortho isocyanate group allow the TDI to be reacted onto the CNT with the para isocyanate, which is sterically hindered and requires greater activation energy, unreacted and viable for further reaction. This reaction is shown below and in FIG. 3.

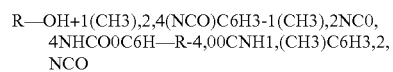

Covalent Bonding of CNT to Plasma Functionalized Fabric

Figure 4:
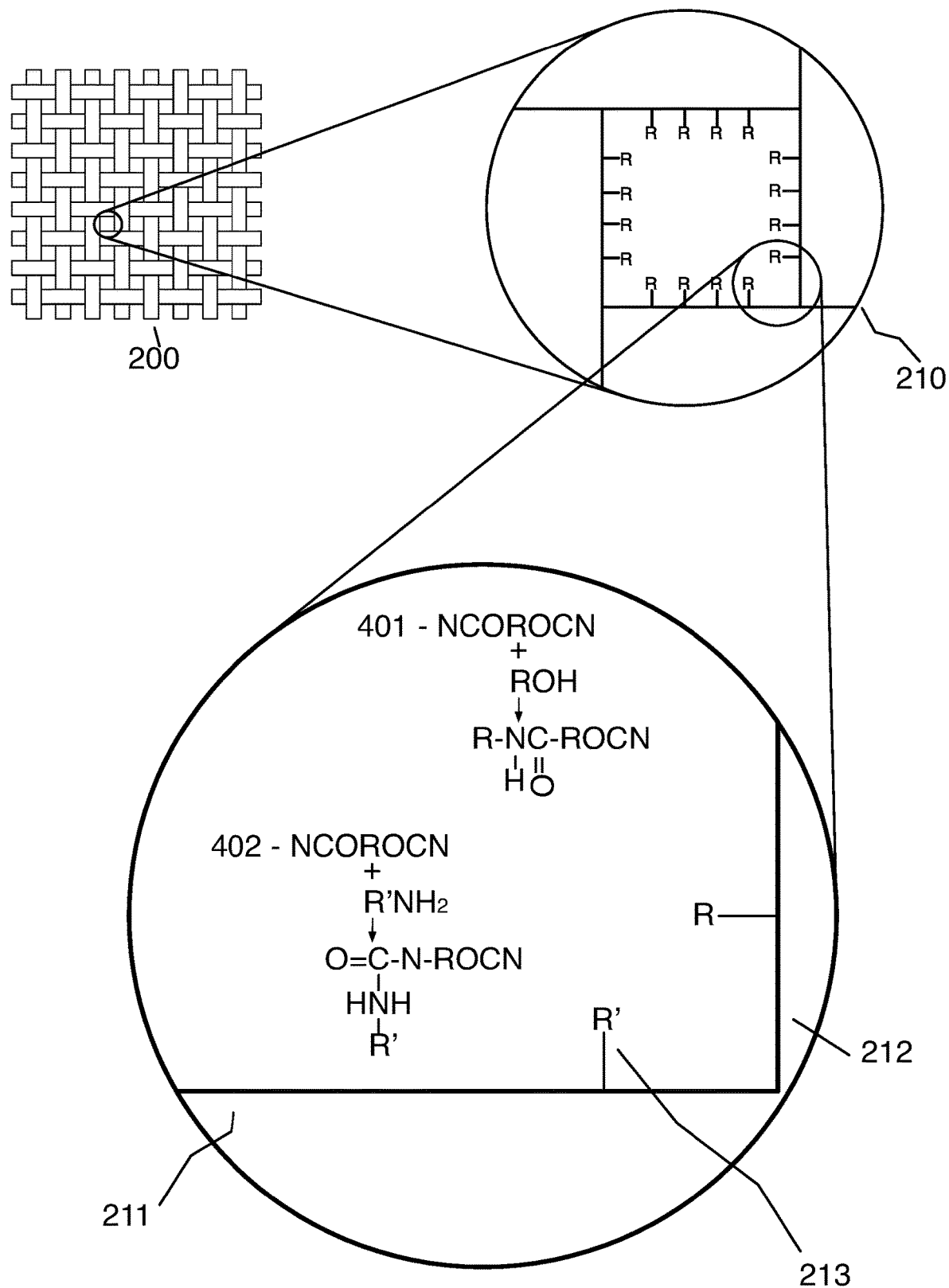
FIG. 4 shows the CNT bonded to the fabric with a schematic of the chemical synthesis used for this reaction.

The para isocyanate group can be readily reacted to hydroxyl functional fabric with increased temperature or catalyst to form a urethane linkage. In FIG. 4 this reaction is illustrated. Woof (211) and warp (212(adjacent fibers in the same fabric with hydroxyl functionality R—OH (213) available to react with the isocyanate groups on the di-functional CNT represented below as OCN—R—CNO This isocyanate will also react with amine groups (R—NH2) very readily without heat or catalyst to form a urea linkage. Control of this reaction is achieved by providing equimolar portions of both reactants. Both of these reactions are illustrated in FIG. 4.

Figure 5:
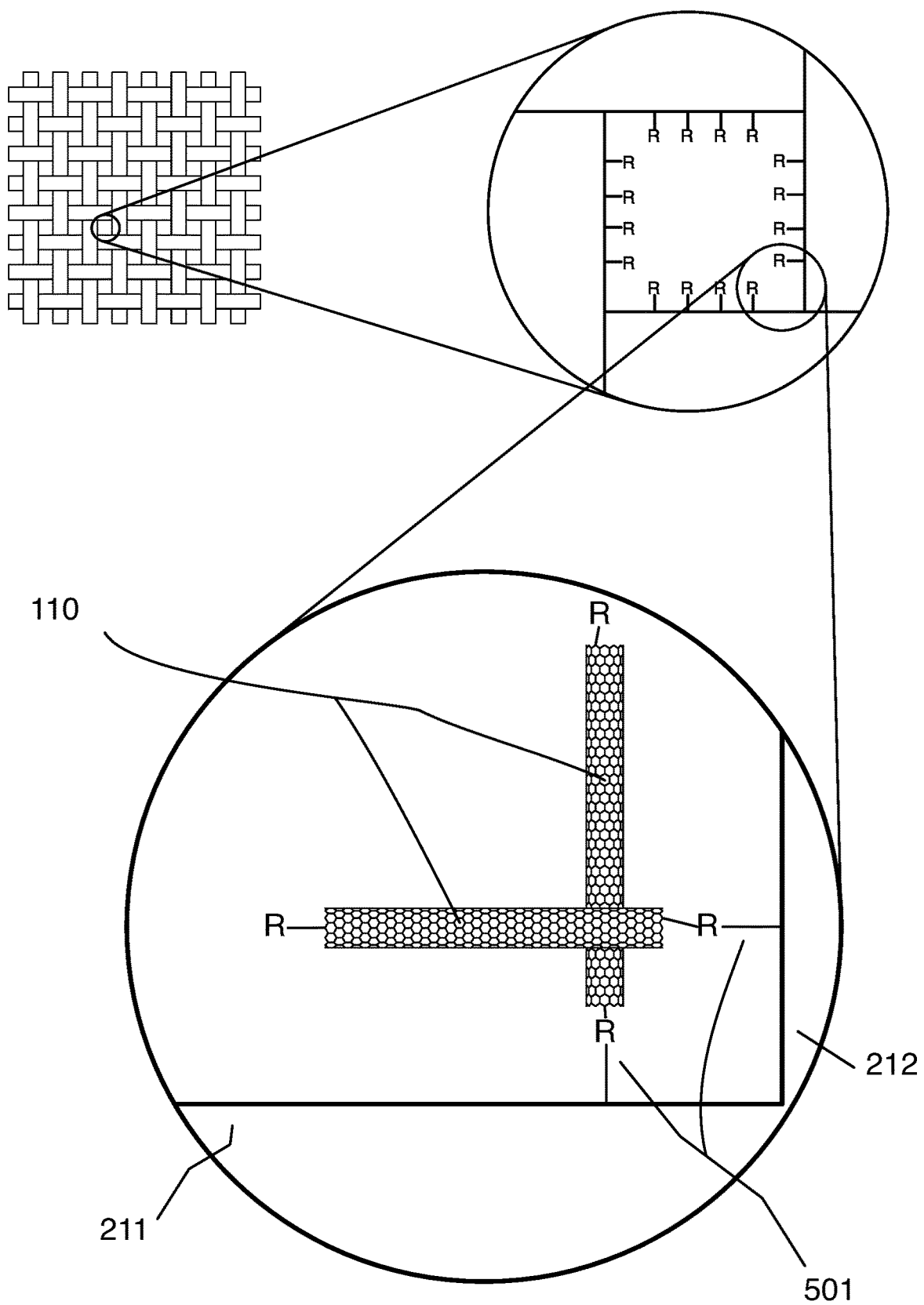
FIG. 5 shows the attachment of the graphene platelet to the Fabric/CNT structure and the chemical synthesis method.
Figure 6:
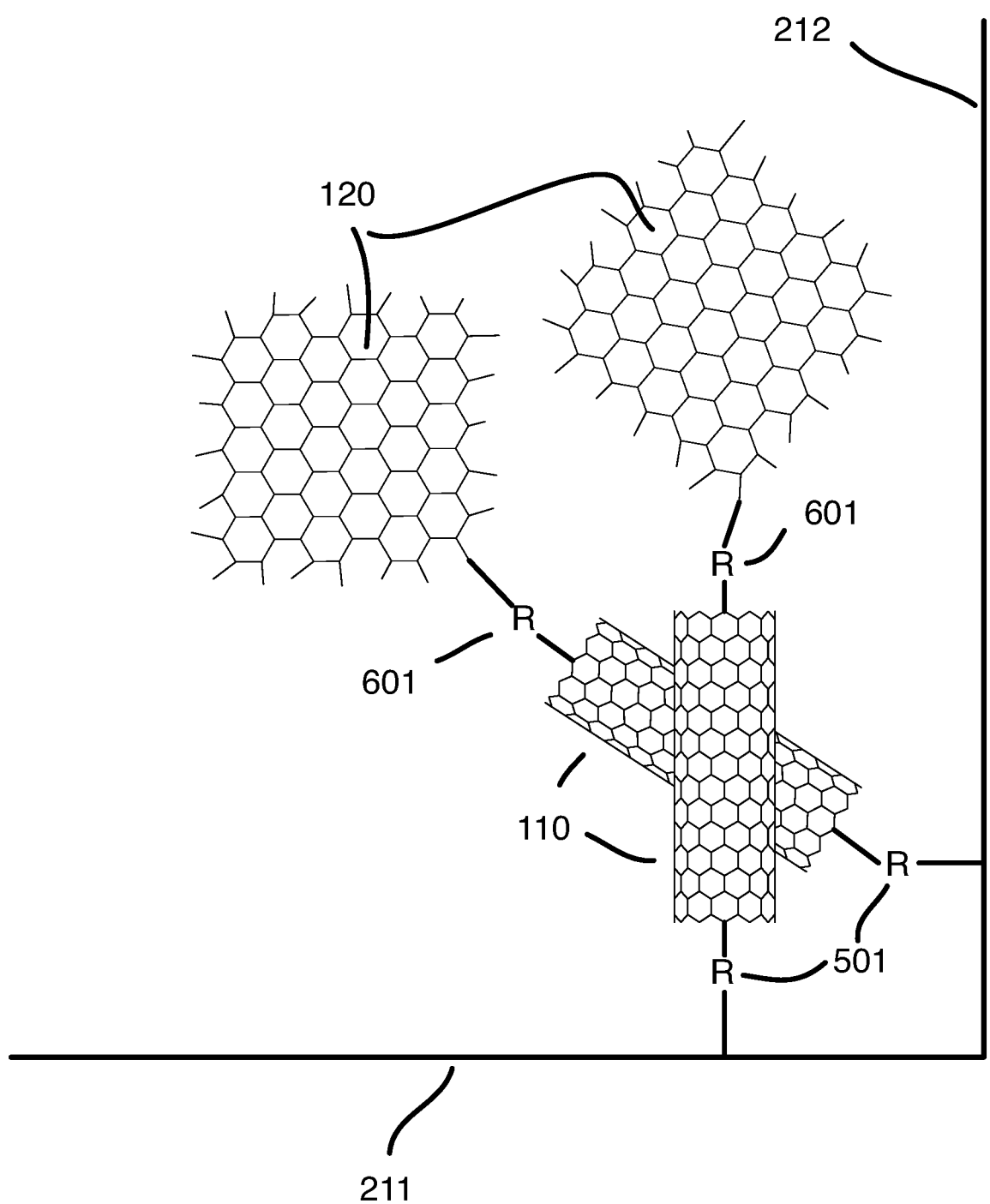
FIG. 6 illustrates the entanglement of carbon nanostructures on a fiber with the carbon nanostructures on an adjacent fabric fiber.

FIG. 5 is an illustration of CNT grafted onto fibers to illustrate the potential of CNT to entangle at woof/warp junctions to increase the strength and modulus of the fabric. The reaction between the hydroxyl and the isocyanate (501) is shown, as the unreacted isocyanate (502) is also shown.
Addition of Graphene to Fabric/CNT The reaction of the graphene platelet to the Fabric/CNT is the same as the reaction shown in FIG. 4 wherein the amine functional graphene platelet forms a urea linkage with the remaining isocyanate group on the CNT (601) that has been adhered to the fabric. In the case where graphene oxide is substituted for functionalized graphene, the addition of graphene oxide platelets to the CNT/fabric is also achieved by urethane reaction between the CNT isocyanate and the hydroxyl groups present on graphene oxide. This is the reaction illustrated in FIG. 4. As is shown in FIG. 6, the larger, flat grapheme particle (120) is attached covalently to the carbon nanotube, or nanoribbon, (110) for the purpose of developing a stronger entanglement. The CNT diameter is generally between 10 and 50 nanometers in diameter and having a length of up to several tens of microns, while the size of the graphene platelet may be tens if microns in diameter. This structure will produce a more entangled "knot" tying the structure together and making it much stronger than the structure of nanotubes as shown in FIG. 5. This effect is easily demonstrated on the macro level by first entangling a comb of strings attached to wands and then separating them, followed by the same experiment having tied disks to the ends and sides of the strings and attempting to separate them.

Figure 7:
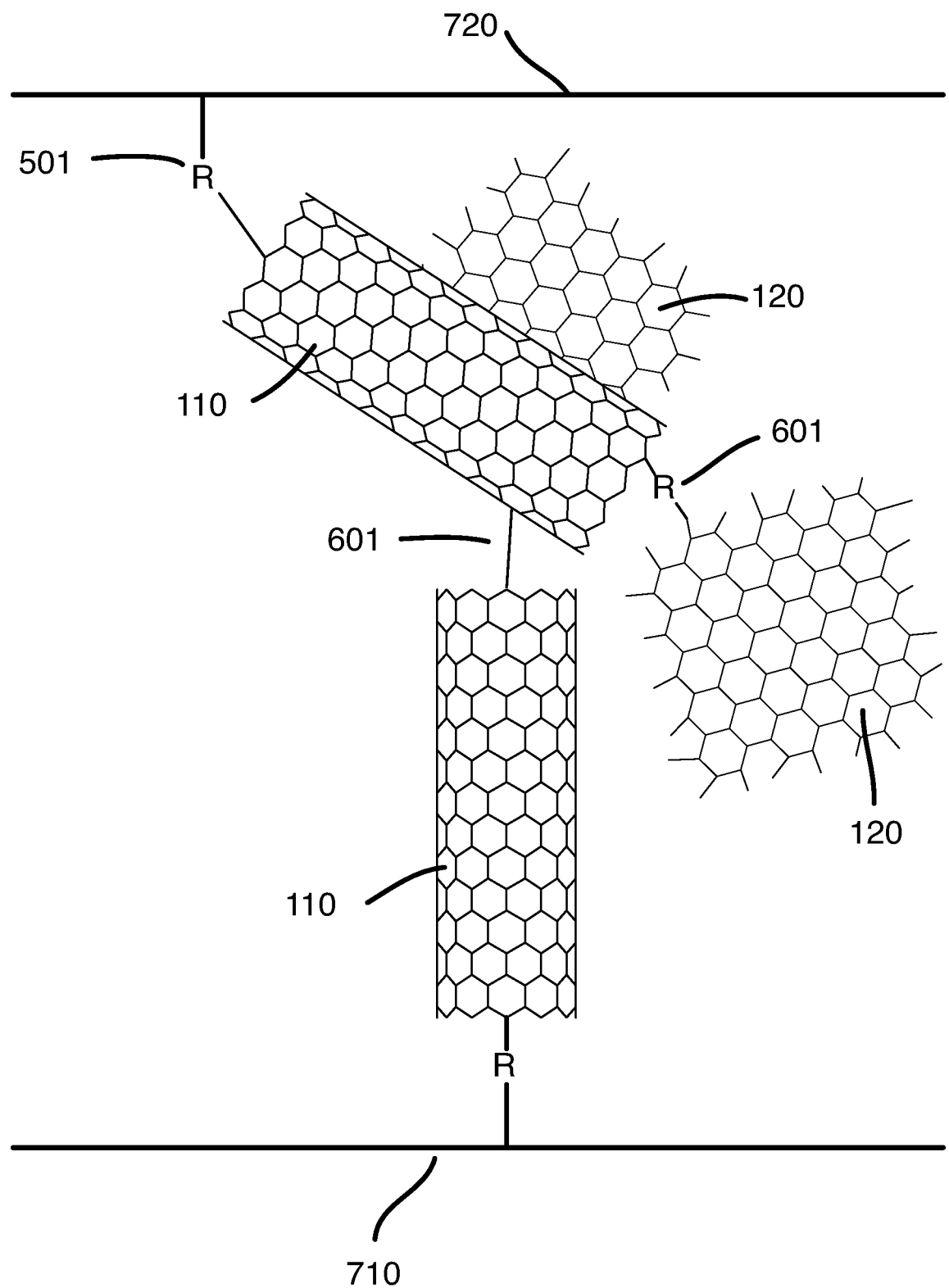
FIG. 7 illustrates the entanglement between the nanostructures on a ply of fabric with the nanostructure on an adjacent fabric ply.

Besides being applicable to reinforcing fibers in a single layer of fabric, this same technique will provide reinforcement between plies of fabrics as shown in FIG. 7. In this instance, the lower ply (710) is connected to a CNT/graphene structure (600), as is the top ply (720). In this case, depending on characteristics of the laminate it may be necessary to construct the nanostructure with longer nanotubes, or graphene nano ribbons, both of which are commercially available. A fabric so constructed will provide major performance enhancement to advanced composite structures in current use for aerospace, aircraft, and vehicle structure by not only strengthening the composite fabric, but also significantly improving the inter laminar shear strength.

Figure 8:
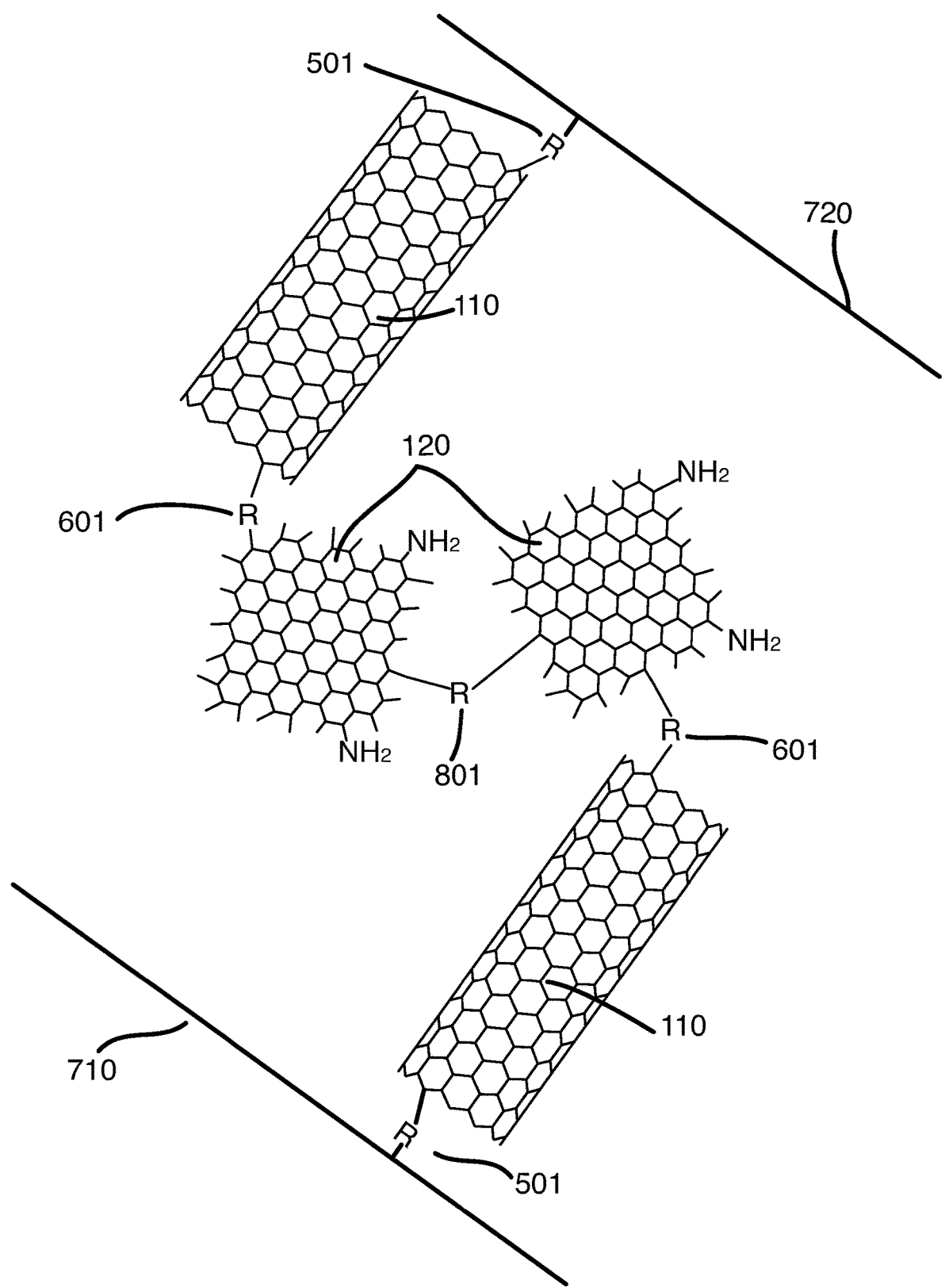
FIG. 8 is an illustration of connection between different fibers in the fabric, or different plies in a laminate that are covalently joined to couple the fibers and/or the plies together.

As shown in FIG. 8, the entire structure between fibers in an individual fabric or between fabric plies in a laminate can be completely joined together by further reacting the residual amine groups on (700) nanostructure with a poly functional isocyanate or epoxide (801). In the case of Polymer composited these amine groups could also react into the matrix resin. This further improves the composite mechanical properties.

These described reactions are exemplary of method to attach and construct a nanostructure to fabrics. As will be obvious to those skilled in the art that a myriad of other reactions can take place to construct similar product. It is also important to note that carbon nanotubes are available in various lengths, as are carbon nano ribbons produced from graphene. The longer nanostructures will likely perform better in improving properties of nanocomposites.

This invention contemplates carbon nanostructures that are used to enhance strength, modulus, inter laminar shear and other mechanical and physical properties through the entanglement of adjacent fibers and adjacent plies of laminated material. These entanglements are designed to develop hierarchal structure binding thread, fiber, fabric, and laminate plies the function in body armor, tensile fabrics, rope etc. is without a binding matrix. The use of the invented structure in composite structures is with a matrix material that could be polymer resins, ceramics or metals.

What is claimed is:

1. A fabric comprising:
a plurality of functionalized fibers; and
a plurality of isocyanate functional carbon nanostructures;
wherein:
the fibers are functionalized using ammonia, carbon dioxide, and vapor of acetic acid such that the fabric comprises amine, hydroxyl, and carboxyl reactive functional groups;
the plurality of isocyanate functional carbon nanostructures are provided by reacting a plurality of carbon nanostructures with diisocyanate;
the isocyanate functional carbon nanostructures are covalently grafted to the fiber thereby becoming part of an intrinsic structure of the fibers.

2. The fabric according to claim 1, wherein the fibers comprise filaments, threads, and/or tow.

3. The fabric according to claim 1, wherein the fibers, and any yarn made therefrom, are natural or synthetic.

4. The fabric according to claim 1, wherein the fibers are made into the fabric by at least one process selected from the group consisting of spinning, weaving, and drawing.

5. The fabric according to claim 1, wherein the fibers are functionalized by a chemical or plasma process.

6. The fabric according to claim 1, wherein the carbon nanostructures comprise at least one nanostructure selected from the group consisting of:
carbon nanotubes;
carbon nanoparticles;
graphene;
carbon nanoribbons; and
graphene oxide.

7. The fabric according to claim 6, wherein the carbon nanostructures comprise carbon nanotubes, graphene, and carbon nanoribbons.

8. The fabric according to claim 1, wherein the functionalized carbon nanostructures are further reacted to form more complex nanostructures comprising two or more joined nanocarbons, wherein each of the two or more joined nanocarbons is grafted to the fiber.

9. The fabric according to claim 8, wherein the formed complex nanostructures are straight nanostructures, or branched nanostructures.

10. The fabric according to claim 8, wherein the formed complex nanostructures grafted to one of the plurality of functionalized fibers are of sufficient size to entangle with adjacent nanostructures grafted to another of the plurality of functionalized fibers thereby developing an entangled network.

11. The fabric according to claim 8, wherein;
at least one of the complex nanostructures has a terminal carbon nanostructure; and
the terminal nanocarbon structure is reactive and is configured to react with an adjacent reactive nanocarbon groups to covalently link fabric fibers into a single layer composite structure.

12. The fabric according to claim 11, wherein the terminal nanocarbon structure of the single layer composite structure is configured to react with a second terminal nanocarbon structure of a second single layer composite structure to form a two-ply composite structure.

13. Soft armor constructed with fabric according to claim 1, 5, or 8.

14. A composite structure constructed with fabric according to claim 1 or 8.

\* \* \* \* \*